US010819732B1

(12) United States Patent
Buggar et al.

(10) Patent No.: US 10,819,732 B1
(45) Date of Patent: Oct. 27, 2020

(54) COMPUTING DEVICE, SOFTWARE APPLICATION, AND COMPUTER-IMPLEMENTED METHOD FOR SYSTEM-SPECIFIC REAL-TIME THREAT MONITORING

(71) Applicant: STATE FARM MUTUAL AUTOMOBILE INSURANCE COMPANY, Bloomington, IL (US)

(72) Inventors: James Michael Buggar, El Paso, TX (US); Ben Miller, El Paso, TX (US); Anne Marie Pudlo, Roswell, GA (US); Brittney Benzio, Atlanta, GA (US); Neha Goel, Atlanta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 249 days.

(21) Appl. No.: 15/926,639

(22) Filed: Mar. 20, 2018

(51) Int. Cl.
*H04L 29/06* (2006.01)

(52) U.S. Cl.
CPC ...... *H04L 63/1433* (2013.01); *H04L 63/1416* (2013.01); *H04L 63/1466* (2013.01)

(58) Field of Classification Search
CPC ............. H04L 63/1433; H04L 63/1466; H04L 63/1416
USPC ......................................................... 726/25
See application file for complete search history.

(56) References Cited

U.S. PATENT DOCUMENTS

| 2005/0235360 | A1* | 10/2005 | Pearson | H04L 29/06 726/23 |
| 2011/0239295 | A1* | 9/2011 | Sorge | H04L 51/12 726/22 |
| 2018/0139227 | A1* | 5/2018 | Martin | H04L 63/1433 |

OTHER PUBLICATIONS

Observation and Response: An Intelligent Approach, J.M. Butler, SANS Institute (2015).
Threat Intelligence: What It Is, and How to Use It Effectively, M. Bromiley, SANS Institute (2016).
(May 7, 2017). Threat Intelligence Platform. Retrieved from http://en.wikipedia.org/wiki/Threat_Intelligence_Platform.

* cited by examiner

*Primary Examiner* — Teshome Hailu
(74) *Attorney, Agent, or Firm* — Faegre Drinker Biddle & Reath LLP

(57) ABSTRACT

A computer-implemented method for real-time threat assessment of system assets. The method includes automatically receiving a plurality of structured threat intelligence data entries and automatically accessing a mapping definition corresponding to a system asset subtype. The mapping definition is automatically compared against the data entries, and at least one of the data entries is automatically matched to the system asset subtype based on the comparison. A threat aptitude and resources number and a threat frequency number are automatically determined based at least in part on the at least one matched data entry.

19 Claims, 3 Drawing Sheets

US 10,819,732 B1

COMPUTING DEVICE, SOFTWARE APPLICATION, AND COMPUTER-IMPLEMENTED METHOD FOR SYSTEM-SPECIFIC REAL-TIME THREAT MONITORING

FIELD OF THE INVENTION

The present disclosure generally relates to computing devices, software applications, and computer-implemented methods for threat assessment and, more particularly, to real-time, system-specific threat assessment.

BACKGROUND

Modern vendors sell information technology threat intelligence data to customers seeking to protect their organization from the latest threats. For instance, structured threat intelligence data may describe potential for exposure and/or previously-recorded events of interest such as account lockouts, database access events, configuration modifications to critical systems, external activity on commonly hacked ports, login and access logs, denial-of-service attacks, and so forth. Customers may process the data to produce reports. The reports may be used by human personnel to determine possible corrective and/or reactive measures that may be adopted within an organization. For instance, a security committee may meet on a weekly basis to review reports and determine actions to be taken internally to better protect against the threats evident in the reports.

BRIEF SUMMARY

Embodiments of the present technology relate to computing devices, software applications, computer-implemented methods, and computer-readable media for real-time threat assessment of system assets.

In a first aspect, a computer-implemented method for real-time threat assessment of system assets may be provided. The method may include the following steps, performed via one or more processors and/or transceivers. The method may include automatically receiving a plurality of structured threat intelligence data entries and automatically accessing a mapping definition corresponding to a system asset subtype. The mapping definition may be automatically compared against the data entries, and at least one of the data entries may be automatically matched to the system asset subtype based on the comparison. A threat aptitude and resources number and a threat frequency number may be automatically determined based at least in part on the at least one matched data entry. The method may include additional, fewer, or alternative actions, including those discussed elsewhere herein.

In another aspect, a computing device for real-time threat assessment of system assets may be provided. The computing device may include a communication element, a memory element, and a processing element. The communication element may be configured to provide electronic communication with a communication network. The processing element may be electronically coupled to the memory element. The processing element may be configured to automatically receive a plurality of structured threat intelligence data entries and automatically access a mapping definition corresponding to a system asset subtype. The processing element may further be configured to automatically compare the mapping definition against the data entries, and to automatically match at least one of the data entries to the system asset subtype based on the comparison. The processing element may still further be configured to automatically determine a threat aptitude and resources number and a threat frequency number based at least in part on the at least one matched data entry. The computing device may include additional, fewer, or alternate components and/or functionality, including that discussed elsewhere herein.

In yet another aspect, a software application for real-time threat assessment of system assets may be provided. The software application may include instructions to automatically receive a plurality of structured threat intelligence data entries and automatically access a mapping definition corresponding to a system asset subtype. The software application may further include instructions to automatically compare the mapping definition against the data entries, and to automatically match at least one of the data entries to the system asset subtype based on the comparison. The software application may still further include instructions to automatically determine a threat aptitude and resources number and a threat frequency number based at least in part on the at least one matched data entry. The software application may include additional, less, or alternate functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of computing devices, software applications and computer implemented methods disclosed therein. It should be understood that each Figure depicts an embodiment of a particular aspect of the disclosed computing devices, software applications and computer implemented methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
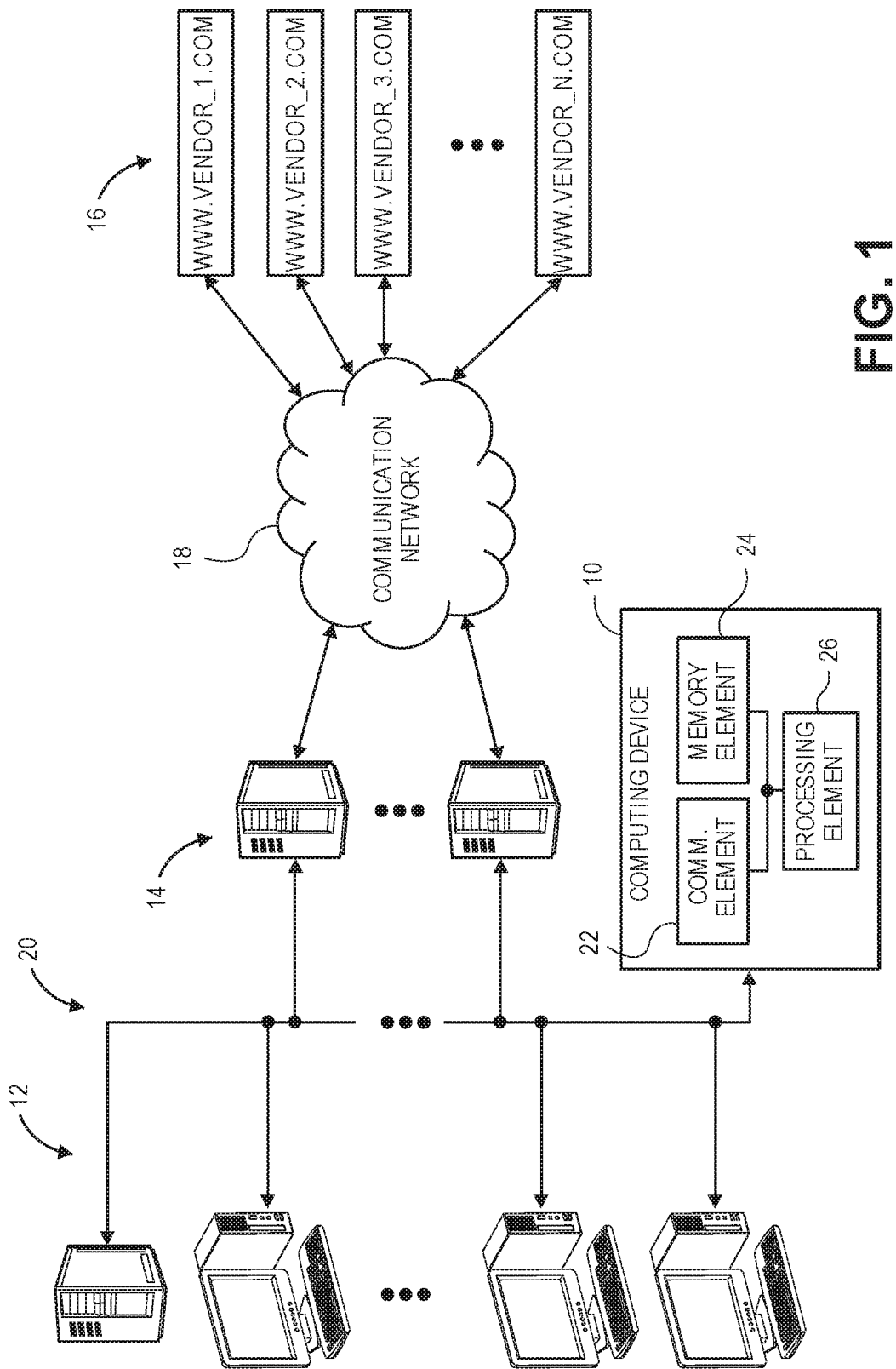
FIG. 1 illustrates an exemplary environment in which embodiments of a computing device for real-time threat assessment of system assets may operate, the exemplary environment including a plurality of computers belonging to an organization, a communication network, and a plurality of web sites.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments address information technology security concerns by providing a new tool for automated threat assessment. The embodiments may be utilized by organizations, such as corporations, government offices, universities, colleges, or the like, which have a significant number of computers (including laptop, desktop, and workstation types of computers), file servers, mail servers, routers, etc., collectively known as "computers," that are networked together. The computers may connect to the Internet through proxy servers and firewall servers in order to access websites.

External threats to the organization's computers may be estimated using event data recorded within third-party systems. For instance, third-party system event logs may record unauthorized activity, and the third parties may sell or otherwise provide such data to data vendors. Data vendors may verify or otherwise vet the event data received from third-party systems and may supplement same with one or more assessment data fields. For example, data vendors may at least partly assess the potential capabilities of the threat(s) represented in the event logs and may record such assessment(s) in one or more data fields associated with the corresponding threat(s). In an embodiment, the data vendor capability assessment(s) may take the form of a number representing the generalized capabilities of each threat, as judged along an established scale (e.g., from one (1) to five (5), with one (1) being a minimally capable threat corresponding to the highest sophistication, skill and/or resources required for successful exploitation). For another example, data vendors may at least partly assess and/or receive an estimate of how likely it is, assuming a threat is presented to the third-party system as a whole, that the threat will attempt to exploit a particular asset subtype present within the third-party system. In an embodiment, the data vendor likelihood assessment(s) may take the form of a value in the range of zero (0) to one (1). Preferably, any such vendor likelihood assessment(s) are recorded with a list of asset subtypes present within the third-party system, which may provide context for interpretation of the value(s).

It is also foreseen that data regarding an organization's own internal threat events may be logged and included in the structured data without departing from the spirit of the present invention.

The event data made available by data vendors may comprise a plurality of structured threat intelligence data entries. Each data entry may comprise a plurality of data fields, with each data field containing information relating to a system event. For instance, each data entry may include a timestamp field with a value corresponding to a time at which a threat event occurred in a third-party system. Each data entry may also include a source address—for instance an Internet Protocol address and/or physical address—representing an origin of a threat to the third-party system which gave rise to classification of the corresponding event as a "threat event." Other data, such as network indicators, attack signatures, domain names, host names, file names, registry data, malware information, recommended action(s), and the like may also be included with one or more of the plurality of structured data entries. The plurality of structured threat intelligence data entries may be transmitted by data vendors in batches (e.g., in intervals as CSV files), as a continuous or rolling feed, or otherwise within the scope of the invention. For instance, in an embodiment the organization may maintain a script for extracting structured threat intelligence data entries from vendor application programming interfaces (APIs) at regular intervals and/or continuously.

Each system asset of the organization that may be susceptible to one or more threats may be considered under embodiments of the present invention. "System assets" generally refers to hardware and/or software of the organization. For instance, in an embodiment the term may correspond to the definition(s) propagated by the FEDERAL FINANCIAL INSTITUTIONS EXAMINATION COUNCIL™ under the Gramm-Leach-Bliley Act of 1999 as of the date of first filing of this disclosure (e.g., defining "information system assets").

Each system asset of the organization that may be susceptible to one or more threats may be categorized within an asset subtype of a plurality of asset subtypes. Assets may be organized within the asset subtypes based on common perceived susceptibilities to threat types. For instance, desktop computers serving as workstations for employees that run a specific operating system may comprise a first asset subtype because they share similar susceptibilities to threats, whereas servers used for providing web and/or e-mail content may comprise a second asset subtype. Moreover, asset subtypes may be delineated based on susceptibilities that vary by placement and function within the organization's network. For instance, desktop computers serving as workstations for employees that run a specific operating system— i.e., devices having essentially identical software and hardware characteristics—may be divided among two or more asset subtypes based on their position within the organization's architecture. One asset subtype may include those desktops that are within a first environment protected by an access barrier such as user-level password protection, certificated authentication and/or firewalls, whereas another asset subtype may include those desktops that are not within the first environment protected by the access barrier (and are therefore more exposed to certain threats). In an embodiment, assets may also or alternatively be categorized according to one or more established taxonomic frameworks, such as the UNITED NATIONS STANDARD PRODUCTS AND SERVICES CODE™ (UNSPSC™). One of ordinary skill will appreciate that other approaches toward grouping assets may be used within the scope of the present invention.

A computing device of the organization may be configured for communication with the data vendor websites via a communication network (discussed in more detail below). The computing device may automatically receive and analyze the structured data entries against the system asset subtypes to automatically develop threat assessment scores for use by the organization. The analysis may include a plurality of algorithms or processes for real-time threat assessment of system assets.

The computing device may also be configured to automatically receive device on-network notifications regarding the organization's system assets, and to maintain a list of the on-network system assets for use in threat assessment as described in more detail below. In an embodiment, a firewall server and/or proxy server may record and/or log requests by system assets to access a website and/or communications to system assets, thereby logging system assets involved in exchanges with external devices. The entries in the logs may each include data fields such as a timestamp representing when a message or packet was received by one of the servers, an Internet Protocol (IP) address for a system asset within the organization, a uniform resource locator (URL) website name, a type of destination URL, a length or character count of the message that was transmitted, whether the message was dropped or not, a port number on which the message was received, a port number used to transmit the message, the communication protocol of the message, an operating system of the system asset transmitting the message, a location in which the system asset resides, and so forth. Exemplary log files may include from approximately 80 to 100 data fields for each entry.

The log may be used to automatically generate and update/maintain a list of on-network system assets that may be used in threat assessment processes as described in more detail below. For instance, the computing device may be configured to automatically scan each log entry for identifying information uniquely identifying each system asset, and for information regarding the characteristics of each asset that inform placement of each asset in one of the asset subtypes. Information regarding the characteristics of each asset may also be obtained via cross-reference to one or more other databases without departing from the spirit of the present invention. For instance, the information of a log file entry may indicate whether the asset in question is within a first secure environment of the organization but may not indicate the operating system run by the asset. Cross-referencing another database including data regarding the organization's assets (e.g., using a unique key obtained from the log file entry) may enable identification of the asset's operating system and, therefore, classification of the asset within the appropriate asset subtype.

The computing device may be configured to analyze a plurality of structured threat intelligence data entries originating with one or more data vendors—the plurality of structured threat intelligence data entries corresponding to a plurality of events having occurred across a first timeframe—in order to assign threat assessment numbers to specific system assets. For instance, each system asset subtype may correspond to a plurality of computing devices identified using automated on-network notifications (discussed above) and may be associated in a memory of the computing device with a mapping definition. The mapping definition may include one or more data field rules, configured for analysis against the plurality of structured threat intelligence data entries. In an embodiment, each data entry that includes a value specified by one of the data field rules—wherein the value is representative of a threat type to which the devices of the asset subtype are susceptible—is matched to that asset subtype. In this manner, a single entry may be matched to one or many system asset subtypes and, in an embodiment, to the devices classified within those asset subtype(s). The computing device may thereby utilize structured threat intelligence data gathered over a particular, e.g., recent, timeframe to automatically generate a real-time snapshot of the threat landscape within the organization presented by external threats.

Exemplary Computing Device

FIG. 1 depicts an exemplary environment in which embodiments of a computing device 10 for real-time threat assessment of system assets may be utilized. The environment may include a plurality of computers 12, a plurality of servers 14, a plurality of data vendor web sites 16, and a communication network 18. The computers 12 and the servers 14 may be located within the network boundaries of a large organization, such as a corporation, a government office, a university, a college, or the like. That is, the computers 12 and servers 14 may all be connected to an internal network 20 of the organization. The communication network 18 and the websites 16 may be external to the organization. The computing device 10 may analyze structured threat intelligence data received from the websites 16 via the network 18 to generate threat assessments for the computers 12 and servers 14—along with other system assets—relevant to specific system assets.

The computers 12 may include tablet computers, laptop computers, desktop computers, workstation computers, smart phones, smart watches, and the like. The computers 12 may also include file servers and mail servers. In addition, the computers 12 may include copiers, printers, routers and any other device that can connect to the internal network 20. Each computer 12 may include a processor and memory, as are known, along with circuitry or an adapter capable of wired or wireless communication with the internal network 20. Furthermore, each computer 12 may include software, such as a web browser or automated software that does not necessarily include a graphical user interface (GUI), which is capable of contacting a website 16. Normal computer behavior may include users (employees of the organization) surfing the web, sending email, doing research that includes retrieving information from websites, placing orders on business websites, or similar activities. Normal behavior may also include machines, such as copiers or printers, automatically reporting data on usage of resources, such as toner and paper, as part of an automated supply process.

The servers 14 may include a plurality of proxy servers and a plurality of firewall servers, as are commonly known. Generally, the servers 14 act as a bridge between the internal network 20 of the organization and the communication network 18 of the outside world. And, all data communication traffic between the internal network 20 and the communication network 18 may pass through the servers 14. Typically, the servers 14 record information regarding the transaction of data that they handle. For example, every time a computer 12 attempts to send data to a web site and every time a computer 12 receives data from a web site, the servers 14 handle the transaction and record information about it. The information may include items and parameters such as a timestamp of the transaction, a source Internet protocol (IP) address, a destination IP address, a source port, a destination port, a size of the data handled in the transaction (in units of bytes), a protocol of the data, a geographic location of the computer 12 involved in the transaction, a type of computer 12 involved, an operating system of the computer 12 involved, a domain name of the web site involved, a type of web site involved, whether or not contact with the web site was allowed, and so forth. The information may be stored in one or more log files, wherein the information about each transaction is stored as an entry in the log file and each piece of information recorded is a field in the entry. The log file may also be considered a large table of data with each entry being a row of data and each field being a column of data. In an exemplary log file, or combination of log files, there may be up to approximately 100 fields or columns and hundreds of millions to hundreds of billions of entries or rows of data. The log file may comprise and/or be used to generate the list of on-network system assets.

Each website 16 may include one or more pages of data and/or multimedia content accessed through the World Wide Web. Each website 16 may be hosted by or stored on a web server. The websites 16 may include top-level domains such as ".com", ".org", ".gov", and so forth. Typically, the websites 16 are accessed using software such as a web browser. In an embodiment the computing device 10 may execute a script for obtaining threat intelligence data from one or more APIs of the websites 16, as discussed in more detail above.

The communication network 18 generally allows communication between the servers 14 of the organization and external websites such as data vendor websites 16. The communication network 18 may include the Internet, cellular communication networks, local area networks, metro area networks, wide area networks, cloud networks, plain old telephone service (POTS) networks, and the like, or combinations thereof. The communication network 18 may be wired, wireless, or combinations thereof and may include components such as modems, gateways, switches, routers, hubs, access points, repeaters, towers, and the like. The servers 14 may connect to the communication network 18 either through wires, such as electrical cables or fiber optic cables, or wirelessly, such as RF communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof.

The computing device 10 may be embodied by a desktop computer, a workstation computer, or the like. The computing device 10 may also be embodied by, or make use of, multiprocessing, parallel processing, supercomputing, or multi-node systems. The computing device 10 may broadly comprise a communication element 22, a memory element 24, and a processing element 26.

The communication element 22 generally allows the computing device 10 to communicate with the servers 14 and the computers 12 of the internal network 20. The communication element 22 may include signal or data transmitting and receiving circuits, such as antennas, amplifiers, filters, mixers, oscillators, digital signal processors (DSPs), and the like. The communication element 22 may establish communication wirelessly by utilizing radio frequency (RF) signals and/or data that comply with communication standards such as cellular 2G, 3G, or 4G, Institute of Electrical and Electronics Engineers (IEEE) 802.11 standard such as WiFi, IEEE 802.16 standard such as WiMAX, Bluetooth™, or combinations thereof. In addition, the communication element 22 may utilize communication standards such as ANT, ANT+, Bluetooth™ low energy (BLE), the industrial, scientific, and medical (ISM) band at 2.4 gigahertz (GHz), or the like. Alternatively, or in addition, the communication element 22 may establish communication through connectors or couplers that receive metal conductor wires or cables, like Cat 5 or coax cable, which are compatible with networking technologies such as ethernet. In certain embodiments, the communication element 22 may also couple with optical fiber cables. The communication element 22 may be in communication with the processing element 26 and the memory element 24.

The memory element 24 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 24 may be embedded in, or packaged in the same package as, the processing element 26. The memory element 24 may include, or may constitute, a "computer-readable medium". The memory element 24 may store the instructions, code, code segments, software, firmware, programs, applications, apps, services, daemons, or the like that are executed by the processing element 26. The memory element 24 may also store settings, data, documents, sound files, photographs, movies, images, databases, and the like.

The processing element 26 may include electronic hardware components such as processors, microprocessors (single-core and multi-core), microcontrollers, digital signal processors (DSPs), field-programmable gate arrays (FPGAs), analog and/or digital application-specific integrated circuits (ASICs), or the like, or combinations thereof. The processing element 26 may generally execute, process, or run instructions, code, code segments, software, firmware, programs, applications, apps, processes, services, daemons, or the like. The processing element 26 may also include hardware components such as finite-state machines, sequential and combinational logic, and other electronic circuits that can perform the functions necessary for the operation of the current invention. The processing element 26 may be in communication with the other electronic components through serial or parallel links that include universal busses, address busses, data busses, control lines, and the like.

Through hardware, software, firmware, or various combinations thereof, the processing element 26 may be configured to perform the operations of embodiments of the present invention. Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary Computer-Implemented Method

Figure 2A:
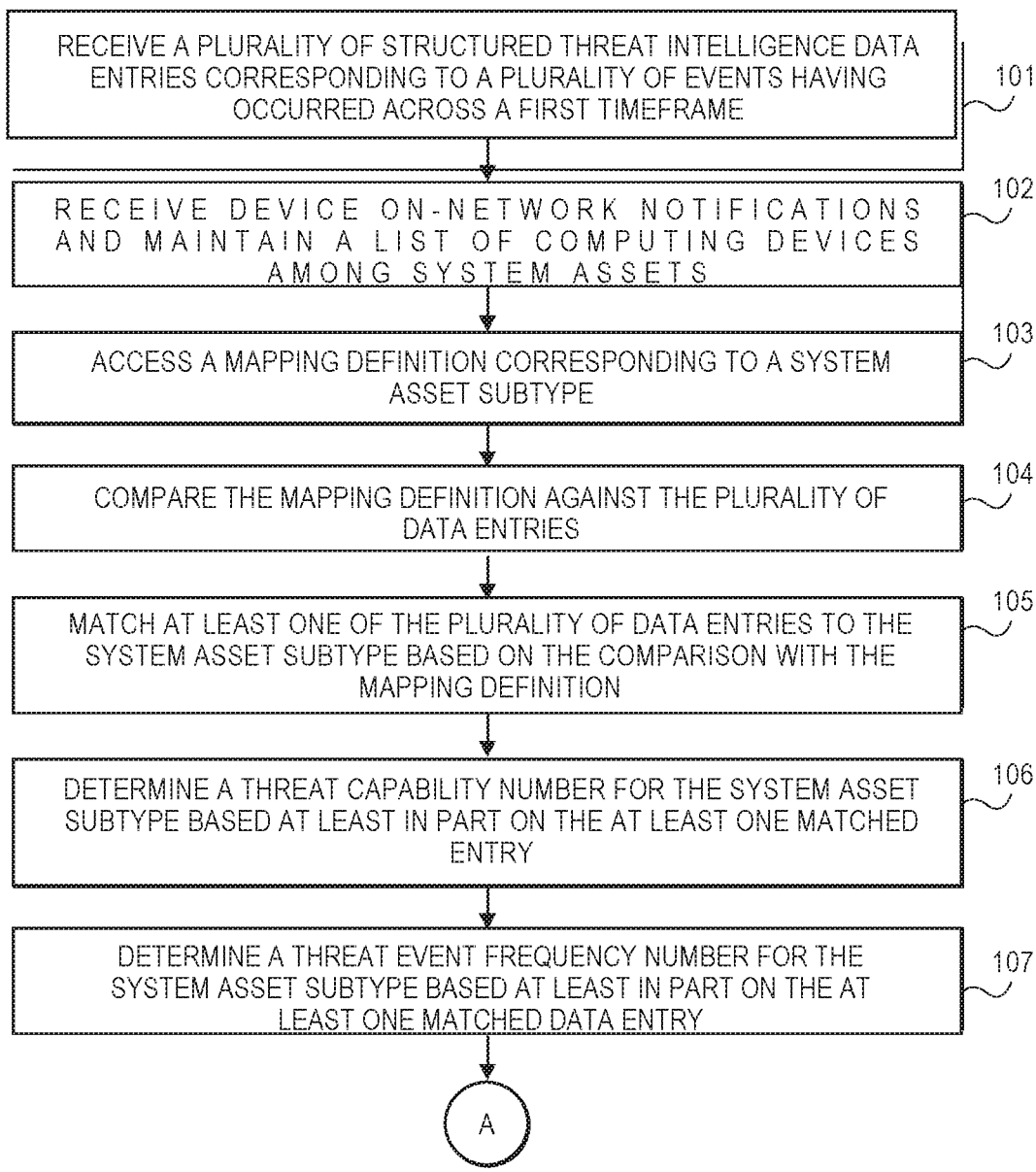
FIGS. 2A-2B illustrate at least a portion of the steps of an exemplary computer-implemented method for real-time threat assessment of system assets.
Figure 2B:
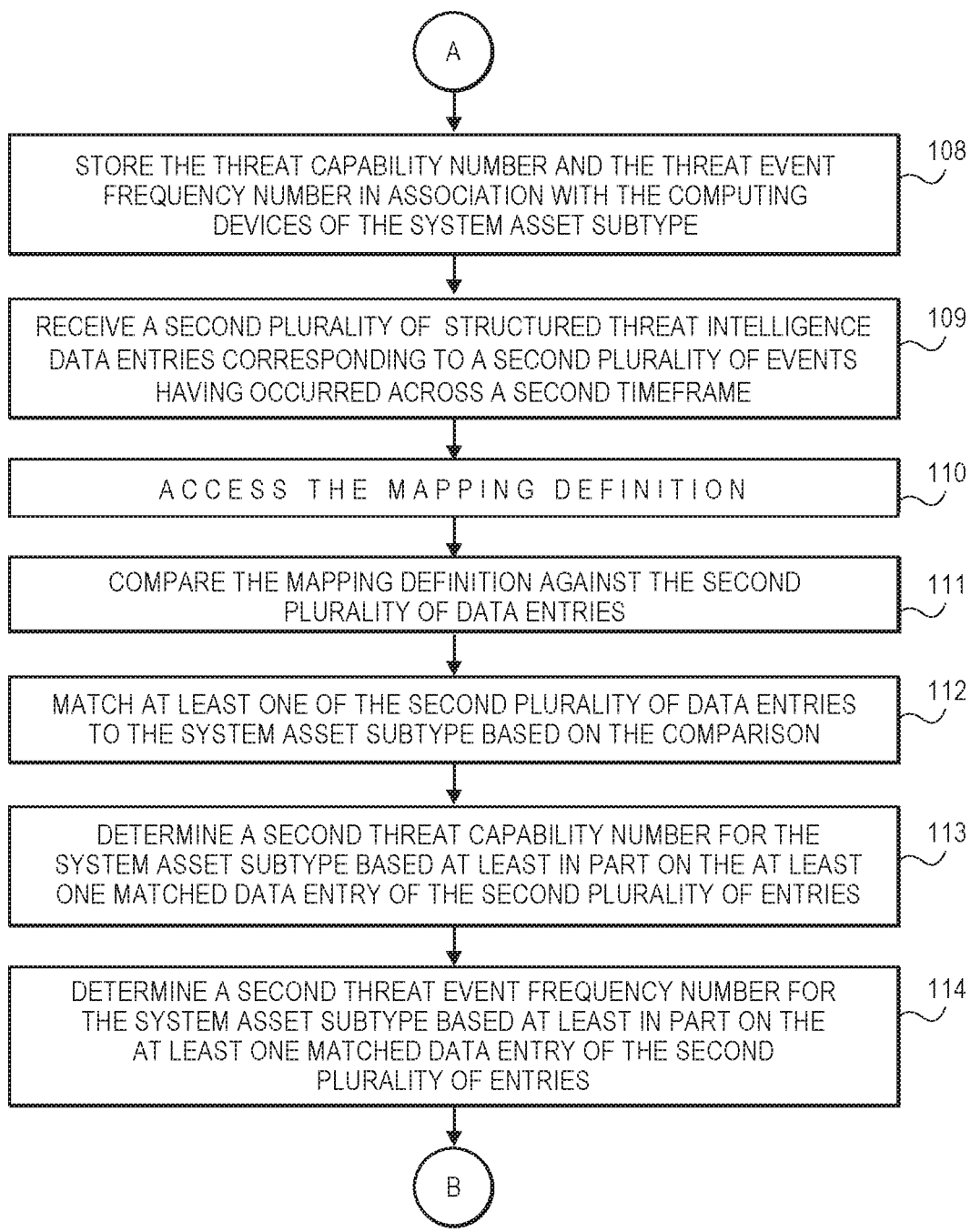

FIGS. 2A-2B depict a listing of steps of an exemplary computer-implemented method 100 for real-time threat assessment of system assets. The steps may be performed in the order shown in FIGS. 2A-2B, or they may be performed in a different order. Furthermore, some steps may be performed concurrently as opposed to sequentially. In addition, some steps may be optional.

The computer-implemented method 100 is described below, for ease of reference, as being executed by exemplary devices and components introduced with the embodiments illustrated in FIG. 1. For example, the steps of the computer-implemented method 100 may be performed by the computing device 10, the servers 14, and the network 18 through the utilization of processors, transceivers, hardware, software, firmware, or combinations thereof. However, a person having ordinary skill will appreciate that responsibility for all or some of such actions may be distributed differently among such devices or other computing devices without departing from the spirit of the present invention. One or more computer-readable medium(s) may also be provided. The computer-readable medium(s) may include one or more executable programs stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Referring to step 101, the computing device 10 may receive a first plurality of structured threat intelligence data entries corresponding to a plurality of events having occurred across a first timeframe, e.g., within the preceding twenty-four (24) hours. The first plurality of threat intelligence data entries may be received from one or more vendor web sites 16. One of ordinary skill will appreciate that the timeframe may be variable—and may depend, for example, on an administrator's judgment and/or an automated assessment of threat persistence—within the scope of the invention.

The first plurality of structured threat intelligence data entries may be transmitted by data vendors in batches (e.g., in intervals as CSV files), as a continuous or rolling feed, or otherwise within the scope of the invention. In an embodiment, the organization may maintain a script for extracting structured threat intelligence data entries from application programming interfaces (APIs) of the data vendors at regular intervals and/or continuously. More particularly, each of the vendor websites 16 may provide access to an API for retrieving at least some of the first plurality of data entries, the computing device 10 executing a script directing retrieval of the first plurality of data entries from one or more of the vendor websites 16.

The first plurality of data entries may include at least one data field containing a value indicating a threat type. In an example, the threat type data field may include a value corresponding to at least one of the following threat types: malicious code, phishing, probes and scans, unauthorized access, data exposure, social engineering, denial of service, inappropriate usage, and non-actionable activity. For instance, a data vendor may utilize a number key system whereby any instance of a data value within the range of 031-039 within a designated data field is categorized as a "malicious code" threat type. Any instance of a data value within the range of 041-049 within the designated data field may be categorized as a "phishing" threat type, and so forth. It is foreseen that a variety of values and value systems may be utilized to classify data entries within threat types without departing from the spirit of the present invention. It is also foreseen that the computing device 10 may include instructions for parsing values of one or more data fields according to one or more data field rules in order to classify data entries within threat types—with or without the aid of a designated threat type data field—without departing from the spirit of the present invention. For instance, a regular expression rule may be utilized to extract vendor severity scores within the scope of the present invention. Moreover, one of ordinary skill will appreciate that other data fields of vendor data may be parsed and/or processed according to automated rules to produce valuable output within the scope of the present invention.

The first plurality of data entries may also include threat assessment metadata regarding the threat events that gave rise to the entries. For instance, data vendors may at least partly assess the potential capabilities of the threat(s) represented in the first plurality of data entries and may record such assessment(s) in one or more corresponding data fields. In an embodiment, the data vendor assessment(s) with respect to each data entry may take the form of a number representing the relative capabilities of the underlying threat, as judged along an established scale (e.g., from one (1) to five (5), with one (1) being a minimally capable threat or one requiring a high level of sophistication, effort and/or resources). One of ordinary skill will appreciate that other threat assessment metadata and/or scale(s) or evaluation criteria may be made available with the vendor data within the scope of the present invention.

Each data entry may also include a timestamp field with a value corresponding to a time associated with the underlying threat event (e.g., a time of receipt at a third-party device, the third-party device having flagged the threat event). Each data entry may also include a source address—for instance an Internet Protocol address or physical address—representing an origin of the underlying threat. Other data, such as network indicators, attack signatures, domain names, host names, file names, registry data, malware information, recommended action(s), and the like may also be included with one or more of the plurality of structured data entries.

Referring to step 102, the servers 14 and/or computing device 10 may be configured to receive device on-network notifications and maintain a list of computing devices of the system assets. More particularly, in an embodiment a firewall server and/or proxy server 14 may record and/or log requests by computers 12 to access a website, external communications transmitted to computers 12, a list of servers 14, and/or any communications between such internal devices, thereby logging active system assets on the internal network. The entries in the logs may each include data fields such as a timestamp when a message or packet was received or sent by one of the servers 14 and/or computers 12, an Internet Protocol (IP) address for the system asset within the organization, a uniform resource locator (URL) website name, a type of the URL, a length or character count of the message that was transmitted, whether the message was dropped or not, a port number on which the message was received, a port number used to transmit the message, the communication protocol of the message, an operating system of the device transmitting the message, a location in which the device resides, and so forth. Exemplary log files may include from approximately 80 to 100 data fields for each entry.

The log may be used to automatically generate and update/maintain a list of on-network system assets that may be used in threat assessment processes as described in more detail below. For instance, the computing device 10 and/or one or more servers 14 may be configured to automatically scan each log entry for information uniquely identifying each computer 12 and/or server 14, and for information regarding the characteristics of each such asset that informs classification in an asset subtype. Information regarding the characteristics of each asset may be obtained via cross-reference to one or more other databases without departing from the spirit of the present invention. For instance, the information of a log file entry may indicate whether the asset in question is within a first secure environment of the organization but may not indicate the operating system run by the asset. Cross-referencing another database regarding the organization's assets (e.g., using a unique key obtained from the log file entry) may enable automated identification of the asset's operating system and, therefore, classification of the asset within the appropriate asset subtype.

The computing device 10 may be configured to maintain, update and/or access the list of system assets populated via receipt of device on-network notifications. The computing device 10 may update the list periodically, so that each newly-installed computer 12 and/or server 14 may be automatically and promptly added to the list and associated with an asset subtype, while each computer 12 and/or server 14 that is inactive according to system logs over a certain period—or otherwise associated with data suggesting an absence from the internal network—may be removed from the list automatically and promptly. In this manner, the computing device 10 may automatically maintain and categorize an inventory of system assets for use in threat assessment. It is also foreseen that the computing device 10 may perform threat assessment analyses based on manually-provided data regarding system assets and/or asset subtypes without departing from the spirit of the present invention.

Referring to step 103, the computing device 10 may access a mapping definition for each of a plurality of system asset subtypes. Each mapping definition may include one or more data field rules governing the types of data values that, if encountered in a data entry of the first plurality of data entries, will cause a match with the corresponding asset subtype. For instance, a first system asset subtype for "internal workstations running operating system A" may have a first mapping definition. The first mapping definition may include a first data field rule including a logical test requiring all data entries with instances of the value "MC" in a specified data field to be matched to the first system asset subtype, it being understood that a first source data vendor typically populates "MC" in the specified data field to indicate a "Malicious Code" threat type. The first mapping definition may also include a second data field rule including a logical test requiring all data entries with instances of the value "023" in a specified data field to be matched to the first system asset subtype, it being understood that a second source data vendor typically populates "023" in the specified data field to indicate a "Phishing" threat type. Under the example described in this paragraph, the first asset subtype is at least somewhat susceptible to Malicious Code and Phishing threat types.

Moreover, a second asset subtype may have a second mapping definition containing data field rules for matching data entries corresponding to Malicious Code and "Data Exposure" threat types to the second asset subtype. It is noted that, in any case, the same data entry may be matched to multiple asset subtypes, for instance where, as in the example above, Malicious Code data entries are matched to both the first and the second asset subtypes.

In an embodiment, the list of on-network system assets maintained by the computing device 10 and/or servers 14 is consulted, and only mapping definitions for asset subtypes having at least one member device on the list are retrieved for further processing described in more detail below.

One of ordinary skill will also appreciate that variously configured mapping definitions and/or data field rules comprising one or more logical, algorithmic, quantitative and/or mathematical standards for evaluating data entries to determine matches against corresponding system asset subtypes are within the scope of the present invention.

Referring to step 104, the mapping definitions may be compared against the first plurality of data entries. The comparison may be conducted in parallel and/or sequentially without departing from the spirit of the present invention. For instance, each data entry may be compared against all mapping definitions retrieved according to preceding steps before moving on to the next data entry. In another example, however, all data entries may be compared against a single mapping definition prior to moving on to the next mapping definition. In yet another example, comparison and mapping definition retrieval steps 104, 103 may be performed with staggered timing—for example where a second mapping definition is accessed after comparisons using the first mapping definition have already begun and/or been completed—without departing from the spirit of the present invention.

Referring to step 105, data entries are matched against asset subtypes based on the comparison against corresponding mapping definitions. In an embodiment, the computing device 10 may register each first instance in which a data entry having a particular threat type is matched against a particular subtype (this being referred to as a threat/subtype "pair"). Subsequent matches of the same threat/subtype pair may be disregarded or counted, depending on the selected counting method (discussed in more detail below). Following completion of step 105, each asset subtype may therefore be associated with metadata regarding the first plurality of data entries comprising a listing of each threat type with which it was matched. In another embodiment, a tally of the number of matches for each threat/subtype pair may also be kept. For instance, thirty (30) data entries having "Malicious Code" threat types may be matched to the first system asset subtype, and records maintained by the computing device 10 regarding the first system asset subtype may reflect those thirty (30) matches of the threat/subtype pair. In still another embodiment, each asset subtype may be associated with metadata and/or a link within memory to each data entry against which its corresponding mapping definition was matched. It is foreseen that storage of matched data entries with respect to corresponding asset subtypes may be performed in a variety of ways—for instance by considering information that may be needed to perform subsequent steps in a variety of embodiments—without departing from the spirit of the present invention. One of ordinary skill will appreciate that a computing device may also register each instance in which no data entries of a threat type described in a mapping definition are found in data entries of a particular timeframe.

Referring to step 106, a threat aptitude and resources number or "TAR number" may be determined for each system asset subtype with respect to the first timeframe based at least in part on the matched data entries. Each TAR number may be an estimate of the sophistication, effort and/or resources required for threats that are most likely to be encountered in the near term to exploit a particular asset subtype. For instance, the TAR number may be a number, on a scale from one (1) to five (5), with one (1) corresponding to a high level of sophistication, effort and/or resources required for exploitation of the asset subtype. In an alternative formulation, the threat aptitude and resources number may correspond to the probable capability a threat agent is capable of applying against an asset. Moreover, it is foreseen that the threat aptitude and resources number may correspond to the threat capability number of the Factor Analysis of Information Risk (FAIR) framework—propagated by the FAIR INSTITUTE™—without departing from the spirit of the present invention.

Returning to an example presented above, data entries having three (3) of nine (9) possible threat types may be matched against the first asset subtype based on the comparison of the first mapping definition against the first plurality of data entries. Thus, it may be assumed, in an embodiment, that the three (3) matched threat types are the most likely threat types to be encountered by the first asset subtype in the near term. The TAR number for the first asset subtype may be calculated for the first timeframe (corresponding to the first plurality of data entries) based in whole or in part on those three (3) matched threat types. The TAR number may therefore comprise an objectively-derived measure of overall sophistication, effort, and/or resources required to exploit the first asset subtype via the threats most likely to be encountered in the near term.

In an embodiment, at least one constituent capability number may be retrieved for each threat/subtype pair and used to calculate the TAR number. For instance, each of the first plurality of data entries may include a data field containing a value representing the originating data vendor's assessment of the generalized TAR of the threat underlying the entry. A constituent capability number may be directly or indirectly derived from such value(s), for example by evaluation of the vendor-provided value by an algorithm configured to relate the generalized value to the first asset subtype specifically. Also or alternatively, a constituent capability number may be accessed and/or retrieved by the computing device from a constituent number database in which constituent numbers are stored for each threat/subtype pair. It is foreseen that constituent numbers for each matched threat/ subtype pair may be accessed, retrieved and/or derived in a variety of ways without departing from the spirit of the present invention.

In an embodiment, each constituent number is defined along the same scale implemented for calculating the TAR number. Such constituent number(s) for each matched threat/subtype pair of the first asset subtype may be averaged to obtain the TAR number for the first asset subtype based on the first timeframe. In an embodiment, two or three of the following constituent number types are retrieved or accessed for each threat/subtype pair: (A) a low capability, (B) a most likely capability (or propensity), and (C) a high capability. The constituent numbers for each threat/subtype pair thus define a constituent capability range. For example, for a first threat/subtype pair of the first asset subtype, constituent numbers 3 (low), 3 (propensity) and 4 (high) may be retrieved from the constituent number database. For a second threat/subtype pair of the first asset subtype, constituent numbers 1 (low), 2 (propensity) and 2 (high) may be retrieved from the constituent number database. For a third threat/subtype pair of the first asset subtype, constituent numbers 3 (low), 3 (propensity) and 3 (high) may be retrieved from the constituent number database. To obtain the TAR number for the first asset subtype, the constituent numbers across all the threat/subtype pairs may be averaged to 2.67.

One of ordinary skill will appreciate that a TAR range may also or alternatively be determined using the constituent capability ranges of the matched threat/subtype pairs of an asset subtype. In the example above, the low constituent numbers may be averaged to determine a low TAR number, the propensity constituent numbers may be averaged to determine a propensity TAR number, and the high constituent numbers may be averaged to determine a high TAR number. Taken together, the low TAR number, the propensity TAR number, and the high TAR number may define a TAR range for the first asset subtype. Moreover, it is foreseen that other mathematical operations—e.g., other measures of central tendency such as median and/or mode—may be used to determine a TAR number and/or TAR range without departing from the spirit of the present invention.

Constituent capability numbers—and particularly those maintained by the organization in the constituent number database—may be updated periodically based on the attributes of the devices included within each asset subtype and/or on the changing characteristics of the threat landscape, as determined by analysis of structured event data or otherwise. It is also foreseen that such updates may be implemented in conjunction with and/or through execution of a machine learning program. The machine learning program may include curve fitting, regression model builders, convolutional or deep learning neural networks, Bayesian machine learning techniques, or the like. For example, the machine learning program may recognize one or more relationships and/or correlations between internal organization threat events on the one hand and structured external event data on the other hand, to inform identification of patterns for iterative improvement of constituent capability numbers.

In an embodiment, servers 14 may keep data logs regarding successful and unsuccessful attempts at exploitation of organization assets. Internal event data logs may include data entries comprising data analogous to that received in the structured data entries from data vendors (as discussed in more detail above). Where the internal event data logs consistently indicate a high success/attempt ratio for a particular threat type with respect to a particular asset subtype, for example, the machine learning algorithm may adjust corresponding constituent capability numbers in the constituent capability number database to reflect an assumption that less TAR is required for exploitation in that threat/subtype pair. For another example, where the internal event data logs indicate that a threat type not included in a mapping definition for a particular asset subtype is, in fact, successfully exploiting an appreciable number of devices of that particular asset subtype, the machine learning algorithm may adjust the mapping definition to include the threat type. It is foreseen that machine learning may be leveraged in several other similar capacities within the scope of the present invention.

Referring to step 107, a threat frequency number or "TF number" may be determined for each system asset subtype with respect to the first timeframe based at least in part on the matched data entries. Each TF number may be an estimate of how likely it is, assuming a threat is presented to the organization as a whole, that the threat will attempt to exploit a particular asset subtype. In an alternative formulation, the threat frequency may correspond to the probable frequency, within a given timeframe, that a threat agent will inflict harm upon an asset. Moreover, it is foreseen that the threat frequency number may correspond to the threat event frequency number of the FAIR framework without departing from the spirit of the present invention.

Returning to an example presented above, data entries from three (3) of nine (9) possible threat types may be matched against the first asset subtype based on the comparison of the first mapping definition against the first plurality of data entries. In an embodiment, consultation of the list of on-network system assets and/or one or more other lists of system assets may reveal, for example, a total of ten (10) asset subtypes within the organization that should be considered as potential avenues for threat exploitation. Data entries of the first plurality of data entries may be matched against the remaining nine (9) asset subtypes substantially in the manner outlined above for the first asset subtype (in reliance on each asset subtype's respective mapping definition). In this manner, a sum of other matched threat/subtype pairs may be identified. More particularly, to calculate the sum of other matched threat/subtype pairs, the computing device 10 may first calculate a sum of threat types matched to each other asset subtype and may then add together the threat type sums across all nine (9) of the other asset subtypes to reach the sum of other matched threat/subtype pairs. For instance, the sum of other matched threat/subtype pairs may be forty-five (45). The sum of other matched threat/subtype pairs may then be added to the sum of threat matches for the first system asset subtype (i.e., three (3)) to get a total threat match number of forty-eight (48). To determine the TF for the first asset subtype, the sum of threat matches for the first system asset subtype (three (3)) may be divided by the total threat match number (forty-eight (48)) to get 0.0625. Likewise, each sum of threat matches for each other asset subtype may be divided by the total threat match number to get a TF for each other asset subtype. In this example, the first asset subtype appears less likely to be the avenue of exploitation for a given threat within the organization as compared against at least some of the other asset subtypes. More particularly, the likelihood of exploitation of the first asset subtype may be represented as 6.25%, whereas the average likelihood of exploitation among the other asset subtypes is about 10.4%.

The ten (10) TF numbers—corresponding respectively to the ten (10) asset subtypes active in the organization network, in the example discussed above—may be further processed to better reveal their significance. For instance, where a scale of one (1) to five (5) is used to represent TAR numbers for each asset subtype, it may be useful to also convert TF numbers to a one (1) to five (5) scale. In an embodiment, a five (5) on such a scale may correspond to an estimate that it is very likely, assuming a threat is presented to the organization as a whole, that the threat will attempt to exploit the particular asset subtype in question. Because the magnitude of the originally-calculated TF numbers may be directly and proportionately related to such a one (1) to five (5) scale, a well-known proportionate scale conversion operation may be used to convert to the new scale. Also or in the alternative, a mathematical partitioning method may be used to analyze clusters of the initially-calculated TF numbers and define the requisite number of partitions (e.g., four (4) partitions) therebetween. An exemplary mathematical partitioning method is K-means clustering, though it is foreseen that any partitioning method may be utilized without departing from the spirit of the present invention.

One of ordinary skill will also appreciate that TF calculations may include weighting to represent the number of data entries matched within each threat/subtype pair within the timeframe in question. For instance, the Malicious Code/first asset subtype pair may have been matched across fifty-five (55) data entries of the first plurality of data entries. In an embodiment, each of the fifty-five (55) matches is counted as a threat match (rather than merely counting each matched threat/subtype pair once, according to the preceding discussion). Returning to the example above, the second threat/subtype pair may have been matched across thirty (30) data entries of the first plurality of data entries, and the third threat/subtype pair may have been matched across two (2) data entries of the first plurality of data entries. A sum of threat matches for the first asset subtype under this exemplary counting method may therefore be eighty-seven (87). Moreover, using the same counting method, a sum of other threat matches across the other nine (9) asset subtypes may be calculated to be six hundred and forty-two (642). Dividing eighty-seven (87) by six hundred and forty-two (642) provides a weighted TF number for the first system asset subtype of about 0.1355. According to this exemplary weighted counting method, taking into account the number of external threat events occurring within the first plurality of data entries significantly changes—in fact, more than doubles—the perceived likelihood that a threat event received by the organization may exploit the first asset subtype. It is foreseen that other methods of weighting and/or counting may be employed to determine threat event frequencies without departing from the spirit of the present invention.

Moreover, the first plurality of data entries may, prior to step 107, be analyzed by the computing device 10 for removal of "duplicate" entries, i.e., those believed to represent the same threat event. For instance, the computing device 10 may automatically access a duplicate control rule and apply the duplicate control rule to the first plurality of data entries to remove duplicate entries representing the same threat event. The duplicate control rule may, for instance, define a pre-determined time difference (e.g., five seconds) for comparison against timestamp data values as well as a threat source address requirement. As applied, the computing device 10 may delete duplicate data entries falling within the pre-determined time difference and having the same threat source address as an original or initial data entry. For example, where two data entries have timestamps within five (5) seconds of each other and the same threat source address, the computing device 10 may remove one (1) of the two (2) data entries from further consideration. It is foreseen that many variations on such a duplicate control rule may be utilized with the present invention.

One of ordinary skill will also appreciate that it may be desirable to correct for potentially disproportionate impact of data entries that are matched to multiple asset subtypes under the weighted counting method. More particularly, where a data entry includes a value defined within the mapping definitions of multiple asset subtypes, its perceived contribution to the TF calculations under the weighted counting method may be unjustifiably high. That is, it may be assumed that the underlying threat represented in such a data entry is unlikely to simultaneously attempt exploitation of all the asset subtypes to which it is matched. Where the weighted counting method is employed to count each such matched data entry as a threat match, disproportionate representation of such a matched data entry may be adjusted for by, e.g., dividing the count of the data entry for each asset subtype by the total number of asset subtypes the data entry is matched against.

It is foreseen that a variety of other statistical, weighting and/or adjustment/compensation methods may also or alternatively be utilized within the scope of the present invention. For instance, the sum of threat matches for the first asset subtype may also or alternatively be weighted according to the number of devices identified as being of the first asset subtype according to the list of on-network system assets at a given time. More particularly, in a vacuum it may be assumed that an asset subtype encompassing a large proportion of an organization's assets is a more likely avenue of exploitation than an asset subtype having only a few members at that time. It is foreseen that a multiplier or other means of adjustment reflecting such differences between asset subtype populations may be applied to, for example, the sums of threat matches for the asset subtypes, without departing from the spirit of the present invention.

Referring to step 108, the TAR number (and/or range) and the TF number for each asset subtype may be stored by the computing device 10. The TAR number (and/or range) and the TF number may be associated with metadata indicating that the determinations were made based on data entries within the first timeframe. In an embodiment, the data will be viewable at a user interface of the computing device. The user interface may present a variety of graphs and charts, and may enable printing of reports and the like, detailing the TF and/or TAR numbers for each asset subtype over time (e.g., before and after the first timeframe). The graphs and charts may enhance visualization and understanding of various trends in presentation to and/or realization of threat types with respect to the organization's internal system assets.

Referring to step 109, the computing device 10 may receive a second plurality of structured threat intelligence data entries corresponding to a second plurality of events having occurred during a second timeframe. It should be noted that steps 109-114 outlined here may be carried out in a substantially similar manner to corresponding steps 101 and 103-107 described above, for example with reference to an updated list of on-network system assets (step 102). Referring to step 110, the computing device 10 may access the mapping definition of each of the plurality of system asset subtypes of the organization. One or more of the mapping definitions may or may not have been altered—e.g., via machine learning mechanisms outlined above—following use in analysis of data entries from the first timeframe. Referring to step 111, the mapping definitions may be compared against the second plurality of data entries. Referring to step 112, data entries of the second plurality of data entries are matched against asset subtypes based on the comparison against corresponding mapping definitions. Referring to step 113, a second TAR number may be determined for each system asset subtype with respect to the second timeframe based at least in part on the matched data entries of the second plurality of data entries for that subtype. In an embodiment, constituent capability numbers are used to calculate the second TAR number of each asset subtype. Also in an embodiment, the constituent capability numbers for each threat/subtype pair are updated from those used in analysis of the first plurality of data entries, for example via parsing of the data fields of the second plurality of data entries and/or revision of the constituent numbers in the constituent number database (e.g., via machine-learning techniques discussed above). Referring to step 114, a second TF number may be determined for each system asset subtype with respect to the second timeframe based at least in part on the matched data entries of the second plurality of data entries for that asset subtype.

In an embodiment, an automated, dynamic tool is presented for objective, real-time assessments of threat landscapes customized for an organization's assets. Such assessments may further be utilized to automate responsive measures, for example via automated adjustment of control measures and/or access controls for certain asset subtypes to account for shifting threat patterns, identity and/or frequency (e.g., as determined automatically via structured data feeds outlined above). Additional assessments may also be performed on the basis of the TAR and TF numbers generated according to embodiments of the present invention, for instance by applying same to impact values and/or control strength(s) assigned to the organization's system assets.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for real-time threat assessment of system assets, comprising, via one or more transceivers and/or processors:
    automatically receiving a plurality of structured threat intelligence data entries;
    automatically accessing a mapping definition corresponding to a system asset subtype, the mapping definition comprising a data field rule indicating a plurality of threat types;
    automatically comparing the mapping definition against the plurality of data entries, comparing the mapping definition including searching for instances of the plurality of threat types within data fields of the plurality of data entries;
    automatically matching at least one of the plurality of data entries to the system asset subtype based on the comparison with the mapping definition, the at least one matched data entry comprising a first data entry including an instance of a first threat type and a second data entry including an instance of a second threat type;
    retrieving a first constituent capability number corresponding to the first threat type and the system asset subtype;
    automatically determining a threat aptitude and resources number for the system asset subtype based at least in part on the at least one matched data entry and the first constituent capability number; and
    automatically determining a threat frequency number for the system asset subtype based at least in part on the at least one matched data entry.

2. The computer-implemented method of claim 1, wherein determining the threat aptitude and resources number for the system asset subtype further includes:
    retrieving a second constituent capability number corresponding to the second threat type and the system asset subtype, and
    generating the threat aptitude and resources number by calculating an arithmetic mean of a plurality of constituent capability numbers including the first constituent capability number and the second constituent capability number.

3. The computer-implemented method of claim 2, wherein the first constituent capability number and the second constituent capability number are retrieved from a pre-determined threat aptitude and resources number database.

4. The computer-implemented method of claim 2, wherein the first constituent capability number and the second constituent capability number are respectively retrieved from data fields of the first data entry and the second data entry.

5. The computer-implemented method of claim 4, wherein the first constituent capability number and the second constituent capability number are respectively retrieved at least in part by parsing data fields of the first data entry and the second data entry using a regular expression rule to extract vendor severity scores.

6. The computer-implemented method of claim 2, wherein:
    the plurality of constituent capability numbers includes a third constituent capability number corresponding to the first threat type and the system asset subtype and a fourth constituent capability number corresponding to the second threat type and the system asset subtype, the first constituent capability number and the third constituent capability number represent boundaries of a first constituent capability range corresponding to the first threat type, the second constituent capability number and the fourth constituent capability number represent boundaries of a second constituent capability range corresponding to the second threat type, and the boundaries of each of the first constituent capability range and the second threat capability range correspond to two of: (A) a low capability, (B) a high capability, and (C) a most likely capability.

7. The computer-implemented method of claim 2, wherein the plurality of data entries corresponds to a plurality of events having occurred across a first timeframe, further comprising:

automatically receiving a second plurality of structured threat intelligence data entries corresponding to a second plurality of events having occurred across a second timeframe;

automatically accessing the mapping definition;

automatically comparing the mapping definition against the second plurality of data entries;

automatically matching at least one of the second plurality of data entries to the system asset subtype based on the comparison with the mapping definition;

automatically determining a second threat aptitude and resources number for the system asset subtype based at least in part on the at least one matched data entry of the second plurality of data entries; and automatically determining a second threat frequency number for the system asset subtype based at least in part on the at least one matched data entry of the second plurality of data entries.

8. The computer-implemented method of claim 7, wherein:

the comparison of the mapping definition against the second plurality of data entries includes searching for instances of the plurality of threat types within data fields of the second plurality of data entries, the at least one matched data entry of the second plurality of data entries includes a third data entry having an instance of the first threat type, the at least one matched data entry of the second plurality of data entries includes a fourth data entry including an instance of a third threat type of the plurality of threat types, the second plurality of data entries does not include a data entry with an instance of the second threat type, determining the second threat aptitude and resources number for the system asset subtype includes:

(A) retrieving the first constituent capability number, (B) retrieving a third constituent capability number corresponding to the third threat type and the system asset subtype, and (C) generating the second threat aptitude and resources number by calculating an arithmetic mean of a second plurality of constituent capability numbers including the first constituent capability number and the third constituent capability number, and determining the second threat aptitude and resources number for the system asset subtype does not include retrieving the second constituent capability number.

9. The computer-implemented method of claim 1, wherein:

each of the plurality of threat types found in the at least one matched data entry is counted as a threat match, a plurality of other mapping definitions corresponding to a plurality of other system asset subtypes are compared against the plurality of data entries and a sum of other threat matches is counted across the plurality of other system asset subtypes, and determining the threat frequency number includes:

counting a sum of threat matches for the system asset subtype, adding the sum of threat matches for the system asset subtype to the sum of other threat matches to get a total threat matches, and dividing the sum of threat matches for the system asset subtype by the total threat matches.

10. The computer-implemented method of claim 9, further comprising:

automatically receiving device on-network notifications regarding a plurality of computing devices of the system asset subtype and a second plurality of computing devices of all the other system asset subtypes; and automatically maintaining a list of the plurality of computing devices and the second plurality of computing devices, wherein the sum of threat matches for the system asset subtype is weighted using a count of the plurality of computing devices and the sum of other threat matches is weighted using a count of the second plurality of computing devices.

11. The computer-implemented method of claim 1, wherein:

each instance in which one of the plurality of threat types is found in the data fields of the at least one matched data entry is counted as a threat match, a plurality of other mapping definitions corresponding to a plurality of other system asset subtypes are compared against the plurality of data entries and instances of matching are added to compute a sum of other threat matches across the plurality of other system asset subtypes, and determining the threat frequency number includes:

counting a sum of threat matches for the system asset subtype, adding the sum of threat matches for the system asset subtype to the sum of other threat matches to get a total threat matches, and dividing the sum of threat matches for the system asset subtype by the total threat matches.

12. The computer-implemented method of claim 11, wherein:

each of the plurality of data entries includes a timestamp and a threat source address, and data entries of the plurality of data entries that share the same threat source address and are separated by less than a pre-determined time-lapse are counted as a single instance.

13. The computer-implemented method of claim 1, wherein a plurality of other threat frequency numbers respectively corresponding to a plurality of other system asset subtypes are determined, the threat frequency number and the plurality of other threat frequency numbers comprising a threat number set, further comprising mathematically partitioning the threat number set on a scale from one (1) to five (5).

14. The computer-implemented method of claim 13, wherein k-means clustering is used to partition the threat number set.

15. The computer-implemented method of claim 1, further comprising:
- automatically receiving device on-network notifications regarding a plurality of computing devices of the system asset subtype;
- automatically maintaining a list of the plurality of computing devices; and
- automatically storing the threat aptitude and resources number and the threat frequency number in association with each of the plurality of computing devices.

16. The computer-implemented method of claim 1, wherein the system asset subtype corresponds to a plurality of computing devices of the system assets that share an attribute.

17. The computer-implemented method of claim 16, wherein the attribute of the system asset subtype corresponds to a shared susceptibility to one or more threat types.

18. The computer-implemented method of claim 17, wherein the attribute comprises a pre-defined operating system.

19. The computer-implemented method of claim 1, wherein each of the plurality of data entries comprises data regarding a security event occurring in a third-party system.

* * * * *